United States Patent
Jiang

(10) Patent No.: US 12,220,642 B2
(45) Date of Patent: Feb. 11, 2025

(54) METHOD AND APPARATUS FOR DISPLAYING PRE-ORDERED PROP, DEVICE, MEDIUM, AND PRODUCT

(71) Applicant: TENCENT TECHNOLOGY (SHENZHEN) COMPANY LIMITED, Shenzhen (CN)

(72) Inventor: Shuai Jiang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 138 days.

(21) Appl. No.: 17/828,447

(22) Filed: May 31, 2022

(65) Prior Publication Data

US 2022/0288497 A1 Sep. 15, 2022

Related U.S. Application Data

(63) Continuation of application No. PCT/CN2021/124381, filed on Oct. 18, 2021.

(30) Foreign Application Priority Data

Dec. 11, 2020 (CN) .......................... 202011457406.4

(51) Int. Cl.
A63F 13/00 (2014.01)
A63F 13/69 (2014.01)
A63F 13/79 (2014.01)

(52) U.S. Cl.
CPC .............. *A63F 13/79* (2014.09); *A63F 13/69* (2014.09); *A63F 2300/575* (2013.01)

(58) Field of Classification Search
CPC ........ A63F 2300/807; A63F 2300/8082; A63F 13/822; A63F 13/00; A63F 13/52; A63F 13/45
See application file for complete search history.

(56) References Cited

U.S. PATENT DOCUMENTS

2015/0005054 A1* 1/2015 Smalley ................. A63F 13/69
463/25
2015/0031440 A1* 1/2015 Desanti ................. A63F 13/822
463/25

(Continued)

FOREIGN PATENT DOCUMENTS

CN 106779933 A 5/2017
CN 108096839 A 6/2018

(Continued)

OTHER PUBLICATIONS

Call of Duty Pre Order Guide—https://youtu.be/sBFhKIWSbG8?si=QWbW67nIFLDxn-Nd (Year: 2021).*

(Continued)

*Primary Examiner* — David L Lewis
*Assistant Examiner* — Eric M Thomas
(74) *Attorney, Agent, or Firm* — ANOVA LAW GROUP PLLC

(57) ABSTRACT

A method for displaying a pre-ordered prop includes: displaying a process of performing actions by a virtual character in a virtual environment; updating an existing virtual resource of the virtual character after the virtual character completes the actions; and displaying, in response to a satisfaction of a pre-order reminder condition, all or part of pre-ordered props on a virtual environment picture using an entry control as a reference position, at least one of the pre-ordered props requiring a redemption resource higher than the existing virtual resource of the virtual character, the entry control being a control related to purchase of a virtual prop for the virtual character, and the pre-ordered props being set before or during a battle.

18 Claims, 13 Drawing Sheets

(56) References Cited

U.S. PATENT DOCUMENTS

| | | | |
|---|---|---|---|
| 2015/0220902 A1* | 8/2015 | Glass | G06Q 20/354 |
| | | | 705/24 |
| 2016/0023106 A1 | 1/2016 | Mizuno | |
| 2019/0201789 A1 | 7/2019 | Yang et al. | |
| 2022/0288497 A1 | 9/2022 | Jiang | |
| 2024/0029137 A1 | 1/2024 | Zhang | |

FOREIGN PATENT DOCUMENTS

| | | |
|---|---|---|
| CN | 108459811 A | 8/2018 |
| CN | 111061949 A | 4/2020 |
| CN | 111589103 A | 8/2020 |
| CN | 111672122 A | 9/2020 |
| CN | 111729299 A | 10/2020 |
| CN | 111729301 A | 10/2020 |
| CN | 111905364 A | 11/2020 |
| CN | 112569607 A | 3/2021 |
| JP | 2012213492 A | 11/2012 |
| JP | 2016029963 A | 3/2016 |
| JP | 2017176690 A | 10/2017 |
| JP | 2023527176 A | 6/2023 |
| WO | 2018006367 A1 | 1/2018 |
| WO | 2018032153 A1 | 2/2018 |
| WO | 2018104834 A1 | 6/2018 |

OTHER PUBLICATIONS

China National Intellectual Property Administration (CNIPA) Office Action 1 for 202011457406.4 Apr. 22, 2022 10 Pages (including translation).

The World Intellectual Property Organization (WIPO) International Search Report for PCT/CN2021/124381 Jan. 19, 2022 7 Pages (including translation).

YK, "How to use the equipment pre-order function of the glory of the king," Qingfeng Network (www.vipcn.com), Dec. 20, 2016, Retrieved from the Internet: URL: https://www.vipcn.com/shoujigame/youxigonglue/467316.html, [retrieved on May 31, 2022]. 8 pages (including translation).

The Japan Patent Office (JPO) Notification of Reasons for Refusal for Application No. 2022-571235 and Translation Sep. 26, 2023 7 Pages.

Check it easily! Arena of Valor strategy summary wiki [online], Jan. 8, 2018, [Searched on Sep. 15, 2023], <https://jp.samural-gamers.com/aov/biginner-items/> 20 pages (including translation).

Tips for enjoying the Switch version of "Arena of Valor"! [edited by Tam], Need for Switch [online], Oct. 16, 2018, [Retrieved Sep. 15, 2023], <https://nss-blog.com/2018/10/16/switch> 21 pages (including translation).

The Japan Patent Office (JPO) Notice of Reasons for Refusal for Application No. 2024-016812 Dec. 10, 2024 9 Pages (including translation).

* cited by examiner

METHOD AND APPARATUS FOR DISPLAYING PRE-ORDERED PROP, DEVICE, MEDIUM, AND PRODUCT

CROSS-REFERENCES TO RELATED APPLICATIONS

This application is a continuation application of PCT Patent Application No. PCT/CN2021/124381, filed on Oct. 18, 2021, which claims priority to Chinese Patent Application No. 202011457406.4, filed on Dec. 11, 2020 and entitled "METHOD AND APPARATUS FOR DISPLAYING PRE-ORDERED PROP, DEVICE, AND MEDIUM", the entire contents of all of which are incorporated herein by reference.

FIELD OF THE TECHNOLOGY

The present disclosure relates to the field of human-machine interaction and, in particular, to a method and an apparatus for displaying a pre-ordered prop, a device, a medium, and a product.

BACKGROUND OF THE DISCLOSURE

In an arena battle-based application, virtual objects are divided into two opposing camps. A terminal controls a virtual object in a virtual environment to perform actions such as walking, purchasing, healing, and fighting, and virtual objects in a same camp collaboratively complete a task in the virtual environment.

When there is a need to view pre-ordered props, a user needs to tap to enter a prop mall interface, and then enter an interface corresponding to a pre-ordered prop list from a specified entry of the prop mall interface.

As such, existing process of viewing pre-ordered props is complex, and requires many steps, resulting in low viewing efficiency.

SUMMARY

Embodiments of the present disclosure provide a method and an apparatus for displaying a pre-ordered prop, a device, a medium, and a product, to quickly display pre-ordered props in a pre-ordered prop list. The method is convenient with less operation steps, achieving high viewing efficiency.

According to an aspect of the embodiments of the present disclosure, a method for displaying a pre-ordered prop is provided, performed by a terminal, the method including: displaying a process of performing activities by a virtual character in a virtual environment; updating an existing virtual resource of the virtual character after the virtual character completes the activities; and displaying, in response to a satisfaction of a pre-order reminder condition, all or part of pre-ordered props on a virtual environment picture using an entry control as a reference position, at least one of the pre-ordered props requiring a redemption resource higher than the existing virtual resource of the virtual character, the entry control being a control related to purchase of a virtual prop for the virtual character, and the pre-ordered props being set before or during a battle.

According to another aspect of the present disclosure, a computer device is provided, including a processor and a memory, the memory storing at least one instruction, at least one program, a code set, or an instruction set, the at least one instruction, the at least one program, the code set, or the instruction set being loaded and executed by the processor to perform a method for displaying a pre-ordered prop. The method includes displaying a process of performing actions by a virtual character in a virtual environment; updating an existing virtual resource of the virtual character after the virtual character completes the actions; and displaying, in response to a satisfaction of a pre-order reminder condition, all or part of pre-ordered props on a virtual environment picture using an entry control as a reference position, at least one of the pre-ordered props requiring a redemption resource higher than the existing virtual resource of the virtual character, the entry control being a control related to purchase of a virtual prop for the virtual character, and the pre-ordered props being set before or during a battle.

According to another aspect of the present disclosure, a non-transitory computer-readable storage medium is provided, storing at least one instruction code, the at least one instruction code being loaded and executed by a processor to perform a method for displaying a pre-ordered prop. The method includes displaying a process of performing actions by a virtual character in a virtual environment; updating an existing virtual resource of the virtual character after the virtual character completes the actions; and displaying, in response to a satisfaction of a pre-order reminder condition, all or part of pre-ordered props on a virtual environment picture using an entry control as a reference position, at least one of the pre-ordered props requiring a redemption resource higher than the existing virtual resource of the virtual character, the entry control being a control related to purchase of a virtual prop for the virtual character, and the pre-ordered props being set before or during a battle.

The technical solutions provided in the embodiments of the present disclosure achieve at least the following beneficial effects:

When a pre-order reminder condition is satisfied, a terminal directly displays pre-ordered props on a virtual environment picture rather than on a mall interface. In this way, operation steps can be effectively reduced, thereby improving the viewing efficiency. In addition, the amount of information transmitted by the terminal to a server can be reduced, thereby relieving running load of the server.

DESCRIPTION OF EMBODIMENTS

Figure 1:
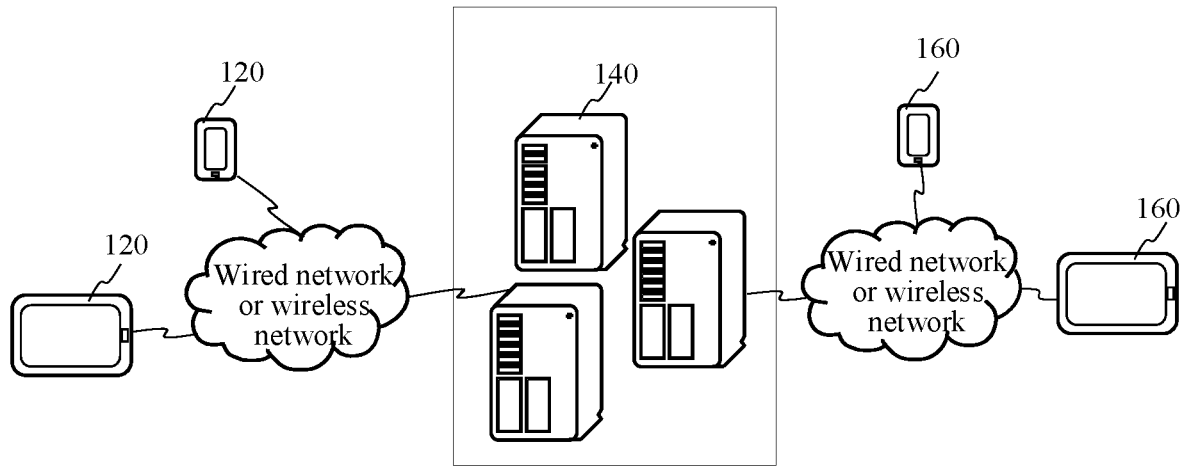
FIG. 1 is a structural block diagram of a computer system according to an exemplary embodiment of the present disclosure.

To make objectives, technical solutions, and advantages of the present disclosure clearer, the following further describes implementations of the present disclosure in detail with reference to the accompanying drawings.

A virtual environment is a virtual environment displayed (or provided) by an application running on a terminal. The virtual environment may be a three-dimensional virtual environment, or may be a two-dimensional virtual environment. The three-dimensional virtual environment may be a simulated environment of a real world, or may be a semi-simulated and semi-fictional environment, or may be a completely fictional environment.

A virtual object is a movable object in a virtual environment. The movable object may be a virtual person, a virtual animal, a cartoon person, or the like, including for example, a person, an animal, a plant, an oil drum, a wall, or a stone displayed in a virtual environment. In some embodiments, when the virtual environment is a three-dimensional virtual environment, the virtual object is a three-dimensional model created based on a skeletal animation technology. Each virtual object has a shape and a volume in the three-dimensional virtual environment, and occupies a part of space in the three-dimensional virtual environment. In some embodiments, when the virtual environment is a two-dimensional virtual environment, the virtual object is a two-dimensional plane model created based on an animation technology. Each virtual object has a shape and an area in the two-dimensional virtual environment, and occupies a part of area in the two-dimensional virtual environment.

A multiplayer online battle arena (MOBA) game is a game in which different virtual teams on at least two opposing camps occupy respective map regions in a virtual world, and contend against each other with a specific victory condition as goals. The victory condition includes, but is not limited to at least one of the following: occupying forts or destroying forts of the opposing camps, killing virtual characters in the opposing camps, ensuring own survivals in a specified scene and time, seizing a specific resource, or outscoring the opponent within a specified time. The battle arena game may take place in rounds. The same map or different maps may be used in different rounds of the battle arena game. Each virtual team includes one or more virtual characters, for example, 1 virtual character, 2 virtual characters, 3 virtual characters, or 5 virtual characters.

A MOBA game is a game in which several forts are provided in a virtual world, and users on different camps control virtual characters to battle in the virtual world, to occupy forts or destroy forts of the opposing camp. For example, in the MOBA game, the users may be divided into two opposing camps. The virtual characters controlled by the users are scattered in the virtual world to compete against each other, and the victory condition is to destroy or occupy all enemy forts. The MOBA game takes place in rounds. A duration of one round of the MOBA game is from a moment at which the game starts to a moment at which the victory condition is satisfied.

A first person shooting (FPS) game is a game in which several forts are provided in a virtual world, and users on different camps control virtual characters to battle in the virtual world, to occupy forts or destroy forts of the opposing camp, or kill all or part of virtual characters in the opposing camp. Generally, in the FPS game, the user plays the game from a first-person perspective, or plays the game from a third-person perspective. For example, in the FPS game, the users may be divided into two opposing camps. The virtual characters controlled by the users are scattered in the virtual world to compete against each other, and the victory condition is to kill all enemies in the opposing camp. The FPS game takes place in rounds. A duration of one round of the FPS game is from a moment at which the game starts to a moment at which the victory condition is satisfied.

A simulation game (SLG) is a game in which a virtual resource is provided in a virtual world to simulate a real world. For example, in the SLG, a plurality of users may be grouped into a single camp to collaboratively complete a specified task. Generally, the victory condition is not set for one round of the SLG.

In a pre-ordered prop list, a pre-ordered prop refers to a virtual prop to be redeemed in a next battle, which is set by the user for a master virtual character before a current battle begins, or refers to one virtual prop (or more virtual props) to be redeemed, which is selected by the user for the master virtual character during the battle. The pre-ordered prop list refers to a list of pre-ordered props arranged according to a specific rule. In some embodiments, an arrangement order of the pre-ordered props may be customized by the user. In some embodiments, the pre-ordered props are arranged according to a synthesis path of virtual props. Alternatively, the arrangement based on the order customized by the user has a first priority, the arrangement based on the synthesis path has a second priority, and two rules are used in combination according to the priorities. For example, equipment A is synthesized by low-level equipment B and low-level equipment C. Therefore, a synthesis path of equipment A includes low-level equipment B and low-level equipment C, and the arrangement order of the pre-ordered props is as follows: low-level equipment B—low-level equipment C—equipment A.

FIG. 1 is a structural block diagram of a computer system according to an exemplary embodiment of the present disclosure. The computer system 100 includes a first terminal 120, a server cluster 140, and a second terminal 160.

An application supporting a virtual environment is installed and run on the first terminal 120. The application program may be any one of a MOBA game, a virtual reality application, a three-dimensional map program, a military simulation program, an FPS game, or a multiplayer shooting survival game. The first terminal 120 is a terminal used by a first user. The first terminal 120 is used by the first user to control a first virtual character in the virtual environment to perform actions. The actions include, but are not limited to at least one of attacking, skill casting, purchasing props, healing, adjusting body postures, crawling, walking, cycling, flying, jumping, driving, picking-up, shooting, or throwing. For example, the first virtual character is a first virtual person.

The first terminal 120 is connected to the server cluster 140 by a wireless network or wired network.

The server cluster 140 includes at least one of a server, a plurality of servers, a cloud computing platform, or a virtualization center. The server cluster 140 is configured to provide a backend service for an application supporting a virtual environment. In some embodiments, the server cluster 140 is responsible for primary computing work, and the first terminal 120 and the second terminal 160 are responsible for secondary computing work. Alternatively, the server cluster 140 is responsible for secondary computing work, and the first terminal 120 and the second terminal 160 are responsible for primary computing work. Alternatively, the server cluster 140, the first terminal 120, and the second terminal 160 perform collaborative computing by using a distributed computing architecture among each other.

An application supporting a virtual environment is installed and run on the second terminal 160. The application program may be any one of a MOBA game, a virtual reality application, a three-dimensional map program, a military simulation program, an FPS game, or a multiplayer shooting survival game. The second terminal 160 is a terminal used by a second user. The second terminal 160 is used by the second user to control a second virtual character in the virtual environment to perform actions. The actions include, but are not limited to at least one of attacking, skill casting, purchasing props, healing, adjusting body postures, crawling, walking, cycling, flying, jumping, driving, picking-up, shooting, or throwing. Schematically, the second virtual character is a second virtual person. The first virtual character and the second virtual character may belong to a same team or a same organization, have a friend relationship with each other, or have a temporary communication permission.

In some embodiments, the applications installed on the first terminal 120 and the second terminal 160 are the same, or the applications installed on the two terminals are the same type of applications on different platforms. The first terminal 120 may generally refer to one of a plurality of terminals, and the second terminal 160 may generally refer to one of a plurality of terminals. In this embodiment, only the first terminal 120 and the second terminal 160 are used as examples for description. The first terminal 120 and the second terminal 160 are of the same or different device types. The device type includes at least one of a smartphone, a tablet computer, an e-book reader, a moving picture experts group audio layer III (MP3) player, a moving picture experts group audio layer IV (MP4) player, a laptop, or a desktop computer.

Figure 2:
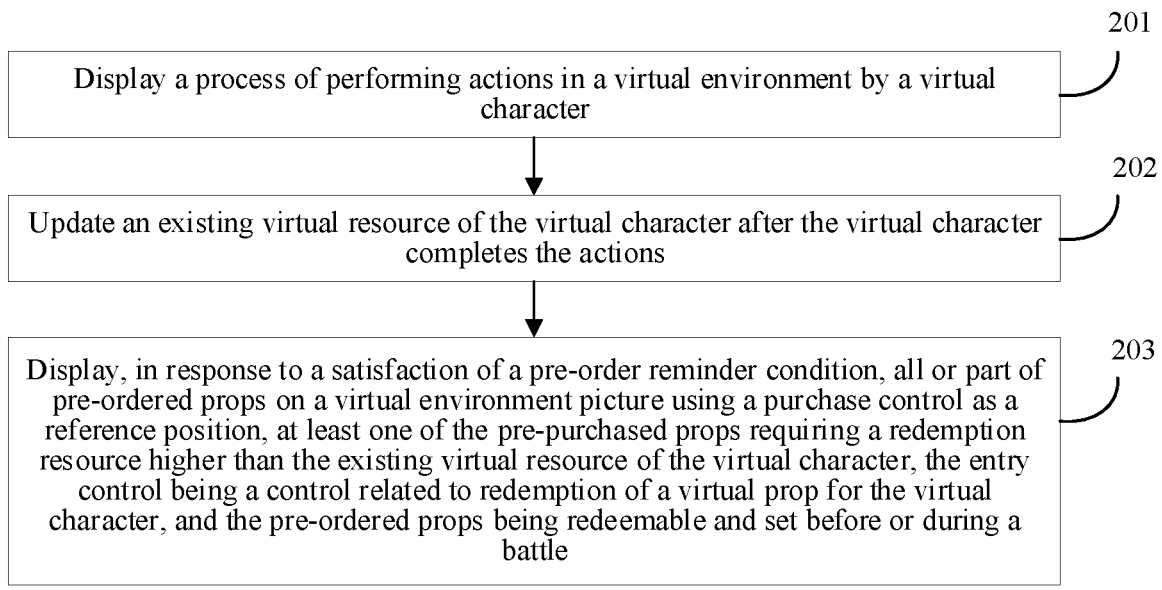
FIG. 2 is a flowchart of a method for displaying a pre-ordered prop according to an exemplary embodiment of the present disclosure.

FIG. 2 is a flowchart of a method for displaying a pre-ordered prop according to an exemplary embodiment of the present disclosure. The method may be performed by the first terminal 120 or the terminal 160 shown in FIG. 1. The method includes the following steps:

Step 201: Display a process of performing actions in a virtual environment by a virtual character.

Figure 3:
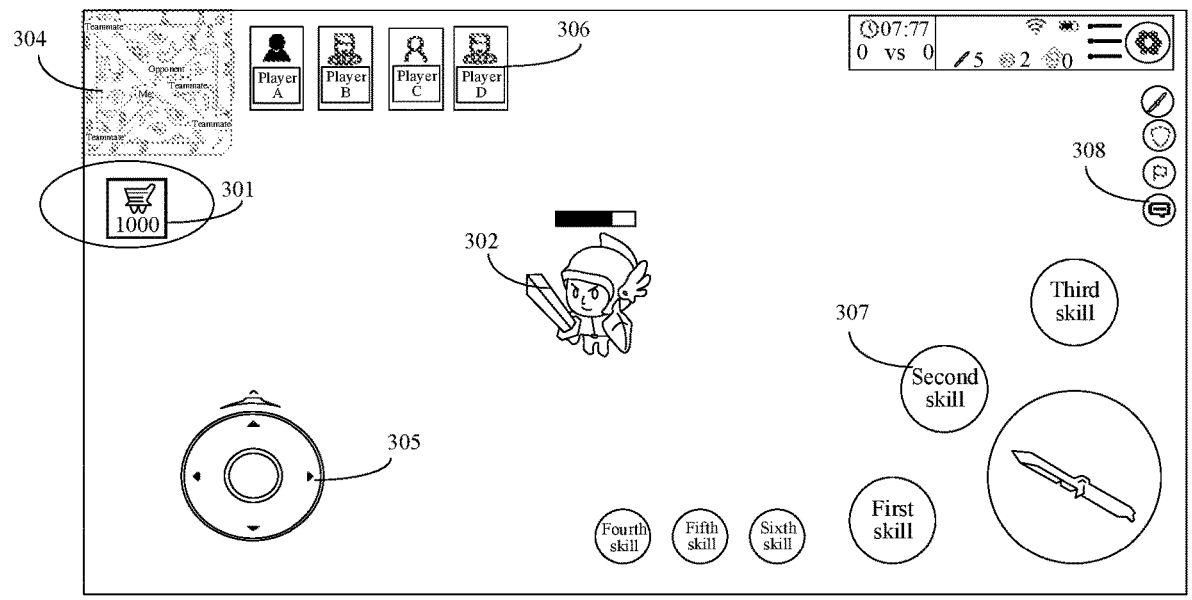
FIG. 3 is a schematic diagram of an interface of a virtual environment picture according to an exemplary embodiment of the present disclosure.

The virtual character is a character controlled by the user. The virtual character may be at least one of a virtual person, a virtual animal, or a virtual item. As shown in FIG. 3, a user controls a virtual character 302 in a virtual environment, and a virtual environment picture also displays an entry control 301, a map 304, a control 305 for moving a virtual object, a friend icon 306, a skill control 307, and a message control 308.

In some embodiments, as shown in FIG. 3, the user may control the virtual character 302 by using the control 305 for moving a virtual object, or the user may press one or more preset physical buttons to control the virtual character 302, or the user may control the virtual character 302 by using signals generated by touching and holding, tapping, double-tapping, and/or sliding on a touchscreen. The control 305 is shown as a joystick in FIG. 3.

In this embodiment of the present disclosure, the virtual character is controlled by a terminal to complete actions in the virtual environment, or the virtual character is controlled by a server to complete actions in the virtual environment, or the virtual character is collaboratively controlled by both the terminal and the server to complete actions in the virtual environment.

The user may obtain an existing virtual resource of the virtual character by controlling the virtual character to perform actions. For example, the actions include at least one of completing a specified action, killing an opposing virtual character, killing a neutral virtual character, destroying an opposing virtual building, occupying a specified region, obtaining all or part of virtual resources of the enemy, depleting all or part of virtual resources of friendly forces, surviving in a virtual environment for a specified time, eliminating all or part of opposing characters, making a specified dialogue, guiding an NPC to a specified position, or completing customized instructions.

Step 202: Update an existing virtual resource of the virtual character after the virtual character completes the actions.

The existing virtual resource is used for redeeming pre-ordered props in the virtual environment. For example, the virtual resource includes at least one of virtual currency, a virtual prop, a property of the virtual character, or an appearance of the virtual character.

The existing virtual resource refers to a virtual resource held by the virtual character. For example, gold coins held by the virtual character are increased after the virtual character kills an opposing character.

Step 203: Display, in response to a pre-order reminder condition being satisfied, all or part of pre-ordered props on a virtual environment picture with an entry control as a reference position, at least one of the pre-ordered props requiring a redemption resource higher than the existing virtual resource of the virtual character, and the pre-ordered props being set before or during a battle.

In this embodiment of the present disclosure, the pre-ordered props may be to-be-redeemed virtual props that are set before the battle, or may be to-be-redeemed virtual props that are set during the battle. The pre-ordered props include all or part of virtual props in an application. The pre-ordered props may be preset by the user, or may be recommended by the application.

The pre-ordered props may usually be divided into several types. For example, the types of the pre-ordered props include, but are not limited to:

Attack equipment: for increasing at least one of physical attack power, an attack speed, or spell attack power of the virtual character.

Defense equipment: for increasing at least one of physical defense power, spell defense power, or health points of the virtual character.

Auxiliary equipment: for achieving various gain effects for a team, for example, at least one of increasing a moving speed, enhancing recovery capability of the virtual character, providing a shield, reducing damage, or increasing output damage.

Jungle equipment: for increasing damage to a neutral character, specifically, increasing at least one of physical attack power, spell attack power, physical defense power, spell defense power, or health points of the virtual character after a specific quantity of neutral characters are killed.

An icon of the pre-ordered prop and a difference corresponding to the pre-ordered prop are displayed on the pre-ordered prop, and the difference is a difference value between the existing virtual resource of the virtual character and a redemption resource required by the pre-ordered prop. For example, it takes 500 gold coins to redeem a pre-ordered prop A; if the virtual character has an existing virtual resource of 490 gold coins, a difference −10 is displayed on the pre-ordered prop A. In some embodiments, the difference is displayed on at least one of the following positions: left, right, top, bottom, upper left, lower left, upper right, or lower right of the icon of the pre-ordered prop.

In some embodiments, when a plurality of pre-ordered props are displayed, each of the pre-ordered props requires a redemption resource higher than the existing virtual resource of the virtual character; or at least one of the pre-ordered props requires a redemption resource higher than the existing virtual resource of the virtual character.

The user cannot exchange the pre-ordered prop when a redemption resource required by a pre-ordered prop is higher than the existing virtual resource of the virtual character. The user may select to redeem a pre-ordered prop when a redemption resource required by the pre-ordered prop is not higher than the existing virtual resource of the virtual character. After the pre-ordered prop is redeemed by the user, all or a part of the virtual resource of the virtual character will be deducted, and the deducted part is related to the redemption resource required by the pre-ordered prop. For example, it takes 800 gold coins to redeem the pre-ordered prop A, and the virtual character has 1000 gold coins. 800 gold coins will be deducted after the user redeems the pre-ordered prop A, and the virtual character has 200 remaining gold coins.

A pre-order reminder condition is used for determining whether pre-ordered equipment needs to be displayed to remind the user of types of pre-ordered props to be redeemed at a next moment. For example, the pre-order reminder condition is that a difference between the existing virtual resource and the redemption resource reaches a threshold. In some embodiments, the pre-order reminder condition is customized by the user. For example, the user may perform a pre-order trigger operation by using signals generated by touching and holding, tapping, double-tapping, and/or sliding in a specified region on a touchscreen.

In some embodiments, when a resource change condition is satisfied, the redemption resource required by the pre-ordered prop may change. For example, the redemption resource required by the pre-ordered prop is related to time. As the user controls the virtual character to perform actions in the virtual environment for a long time, the redemption resource required by the pre-ordered prop decreases. Alternatively, the user may use some virtual props to reduce the redemption resource required by the pre-ordered prop. Alternatively, the user may control the virtual character to complete a specified task, to reduce the redemption resource required by the pre-ordered prop. For example, it takes 600 gold coins to redeem the pre-ordered prop at the beginning of a battle of a game, and it takes 300 gold coins to redeem the pre-ordered prop after the battle goes on for 20 minutes.

The entry control is related to purchase of a virtual prop for the virtual character. A virtual prop purchase interface may be displayed through the entry control when the user uses the application. For example, a tap on the entry control may trigger the display of a prop mall interface. In some embodiments, the entry control is related to the existing virtual resource of the virtual character. For example, the entry control is a backpack control of the virtual character, and the user may open a backpack of the virtual character by tapping the backpack control. In some embodiments, the entry control is related to a pre-ordered prop list of the virtual character. For example, the user may tap the entry control to display the pre-ordered prop list.

The virtual environment picture is a picture obtained by observation in a virtual world from a first-person perspective or a third-person perspective of a virtual character during running of the application in the terminal. In some embodiments, in the embodiments of the present disclosure, the virtual environment picture is a picture of the virtual character observed by using a camera model in the virtual world. In some embodiments, the virtual environment picture further includes at least one of the following display elements: a thumbnail map from a God's perspective, a backpack control, a direction indication control, a dialog box, an external voice switch, a microphone switch, a control for moving a virtual object, or a control for controlling a virtual object to perform a preset action.

In some embodiments, the camera model automatically follows the virtual character in the virtual world. That is, when a position of the virtual character in the virtual world changes, a position of the camera model following the virtual character in the virtual world changes simultaneously, and the camera model is always within a range of a preset distance away from the virtual character in the virtual world. In some embodiments, in the automatic following process, relative positions of the camera model and the virtual character remain unchanged.

The camera model refers to a three-dimensional model located around the virtual character in the virtual world. When the first-person perspective is used, the camera model is located around the head of the virtual character or located at the head of the virtual character. When the third-person perspective is used, the camera model may be located behind the virtual character and bound to the virtual character, or may be located at any position away from the virtual character by a preset distance. The virtual character located in the virtual world may be observed from different angles through the camera model. In some embodiments, when the third-person perspective is a first-person over-shoulder perspective, the camera model is located behind the virtual character (for example, the head and shoulders of the virtual character). In some embodiments, in addition to the first-person perspective and the third-person perspective, there are also other perspectives, such as a top perspective. When the top perspective is used, the camera model may be located above the head of the virtual character. The top perspective is a perspective for observing the virtual world from the sky. In some embodiments, the camera model is not actually displayed in the virtual world. In other words, the camera model is not shown in the virtual world displayed on the virtual environment picture.

Description is made by using an example in which the camera model is located at any position at a preset distance away from the virtual character. In some embodiments, one virtual character corresponds to one camera model, and the camera model is rotated with the virtual character as a rotation center. For example, the camera model is rotated with any point of the virtual character as the rotation center. During rotation, the camera model is not only rotated, but also displaced. During rotation, a distance between the camera model and the rotation center remains unchanged, that is, the camera model is rotated on a surface of a sphere with the rotation center as a sphere center. Any point of the virtual character is the head or the torso of the virtual character, or any point around the virtual character. This is not limited in the embodiments of the present disclosure. In some embodiments, when the virtual character is observed by using the camera model, the center direction of the perspective of the camera model is a direction from a point on a spherical surface on which the camera model is located to the sphere center.

Figure 4:
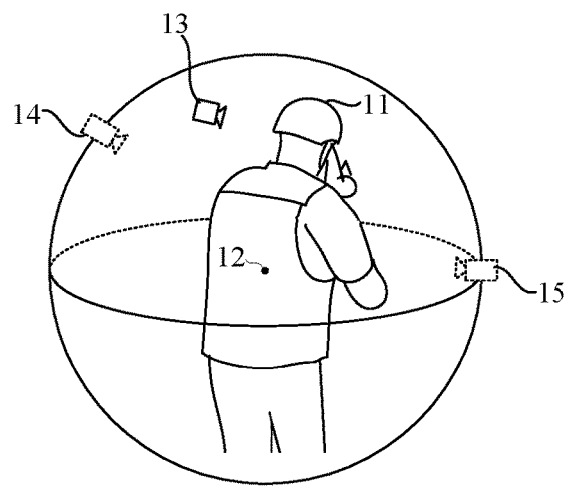
FIG. 4 is a schematic diagram of a camera model according to an exemplary embodiment of the present disclosure.

In some embodiments, the camera model may further observe the virtual character from different directions of the virtual character at a preset angle. For example, referring to FIG. 4, a point in a virtual character 11 is determined as a rotation center 12, and the camera model rotates around the rotation center 12. In some embodiments, the camera model is configured with an initial position, and the initial position is an upper position behind the virtual character 11 (for example, a position behind the brain). For example, as shown in FIG. 4, the initial position is position 13; when the camera model rotates to position 14 or position 15, the perspective direction of the camera model changes with the rotation of the camera model.

In some embodiments, in response to a pre-order reminder condition being satisfied, all or part of pre-ordered props corresponding to a type of the virtual character are preferentially displayed on the virtual environment picture with the entry control as a reference position. The type of the virtual character includes at least one of a tank, a warrior, a mage, a shooter, an auxiliary, or an assassin. For example, when the virtual character is a mage, the pre-ordered prop A is displayed on the virtual environment picture with the entry control as the reference position. The pre-ordered prop A is used for increasing the spell attack power of the virtual character.

In an exemplary embodiment, the pre-ordered props may be displayed in several forms, including but not limited to the following four display methods:

1. Display the pre-ordered props at peripheral positions of the entry control on the virtual environment picture.

Figure 6:
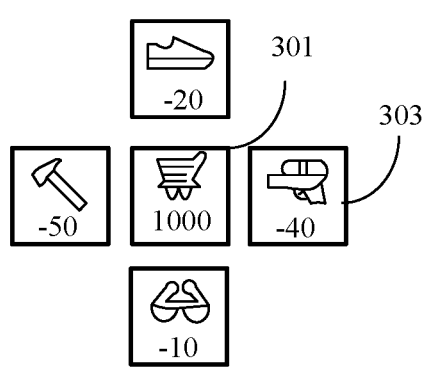
FIG. 6 is a schematic diagram of an interface of an arrangement method of pre-ordered props according to an exemplary embodiment of the present disclosure.

As shown in FIG. 6, when there are a plurality of pre-ordered props to be displayed, pre-ordered props 303 are peripherally arranged around an entry control 301. The plurality of pre-ordered props are displayed according to the order in the pre-ordered prop list. For example, the pre-ordered props in the pre-ordered prop list are arranged in the following order: pre-ordered prop A—pre-ordered prop B—pre-ordered prop C. During the display, the pre-ordered props are arranged clockwise in the order of pre-ordered prop A—pre-ordered prop B—pre-ordered prop C.

2. Sequentially display at least two pre-ordered props on the virtual environment picture with the entry control as a head of a line or a row and according to a ranking order.

Figure 7:
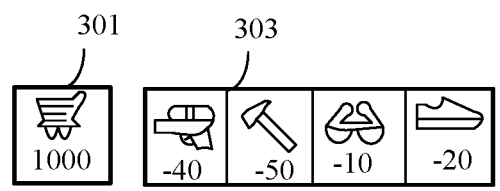
FIG. 7 is a schematic diagram of an interface of an arrangement method of pre-ordered props according to an exemplary embodiment of the present disclosure.

As shown in FIG. 7, the pre-ordered props 303 are displayed with the entry control 301 as the head of the row. The plurality of pre-ordered props are displayed according to the order in the pre-ordered prop list. For example, the pre-ordered props in the pre-ordered prop list are arranged in the following order: pre-ordered prop A—pre-ordered prop B—pre-ordered prop C. During the display, the pre-ordered props are arranged from left to right in the order of pre-ordered prop A—pre-ordered prop B—pre-ordered prop C.

3. Sequentially display at least two pre-ordered props on the virtual environment picture with the entry control as a head of a column and according to a ranking order.

Figure 8:
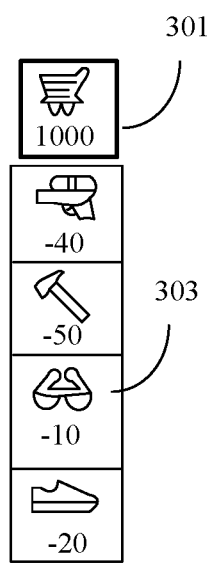
FIG. 8 is a schematic diagram of an interface of a pre-ordered prop arrangement method according to an exemplary embodiment of the present disclosure.

As shown in FIG. 8, the pre-ordered props 303 are displayed with the entry control 301 as the head of the column. The plurality of pre-ordered props are displayed according to the order in the pre-ordered prop list. For example, the pre-ordered props in the pre-ordered prop list are arranged in the following order: pre-ordered prop A—pre-ordered prop B—pre-ordered prop C. During the display, the pre-ordered props are arranged from top to bottom in the order of pre-ordered prop A—pre-ordered prop B—pre-ordered prop C.

4. Circumferentially display at least two pre-ordered props on the virtual environment picture with the entry control as a central position.

Figure 9:
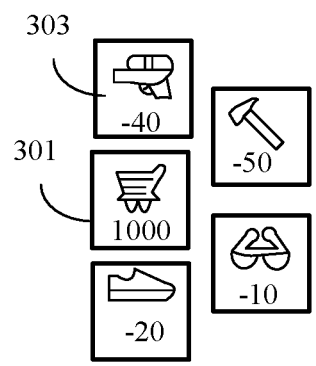
FIG. 9 is a schematic diagram of an interface of an arrangement method of pre-ordered props according to an exemplary embodiment of the present disclosure.

As shown in FIG. 9, the pre-ordered props 303 are displayed with the entry control 301 as the central position. The plurality of pre-ordered props are displayed according to the order in the pre-ordered prop list. For example, the pre-ordered props in the pre-ordered prop list are arranged in the following order: pre-ordered prop A—pre-ordered prop B—pre-ordered prop C. During the display, the pre-ordered props are arranged clockwise in the order of pre-ordered prop A—pre-ordered prop B—pre-ordered prop C.

In some embodiments, the pre-ordered props have display priorities. For example, there are three props A, B, and C which are arranged in the order of prop A—prop B—prop C, and the prop A is preferentially displayed. The priority may be customized by the user, or may be used according to default configuration of the application.

Figure 5:
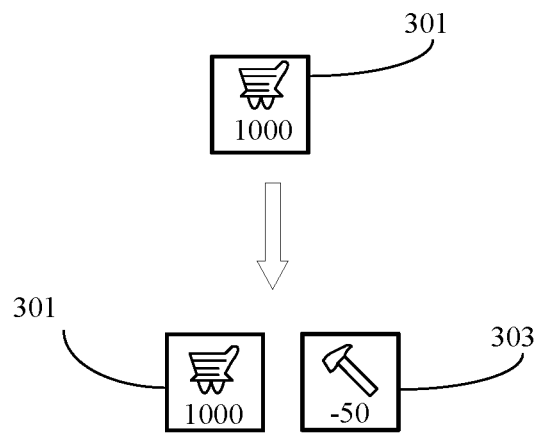
FIG. 5 is a schematic diagram of displaying a pre-ordered prop according to an exemplary embodiment of the present disclosure.

As shown in FIG. 5, an existing virtual resource of 1000 gold coins of the virtual character is displayed on the entry control. When a difference between the existing virtual resource and a redemption resource required for deeming a pre-ordered prop 303 is −50 gold coins, the pre-ordered prop is displayed on a right side of the entry control 301.

Based on the above, in this embodiment, when a pre-order reminder condition is satisfied, a terminal directly displays a pre-ordered prop on a virtual environment picture rather than on a mall interface. In this way, operation steps can be effectively reduced, thereby improving the viewing efficiency. In addition, the amount of information transmitted by the terminal to a server can be reduced, thereby relieving running load of the server.

Figure 10:
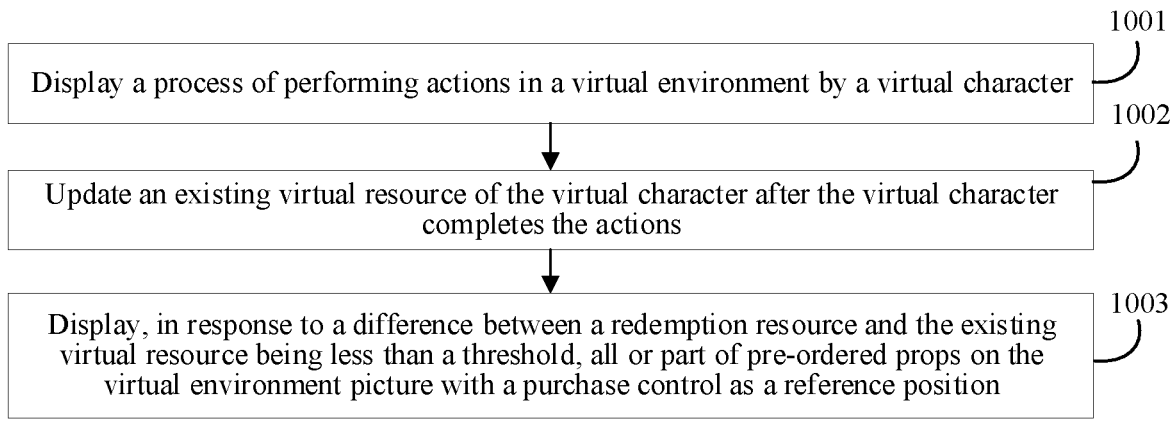
FIG. 10 is a flowchart of a method for displaying a pre-ordered prop according to an exemplary embodiment of the present disclosure.

FIG. 10 is a flowchart of a method for displaying a pre-ordered prop according to an exemplary embodiment of the present disclosure. The method may be performed by the first terminal 120 or the terminal 160 shown in FIG. 1. The method includes the following steps:

In an optional embodiment based on the embodiment in FIG. 2, steps 201 and 202 are alternatively implemented as steps 1001 and 1002 below. For some embodiments, reference may be made to the embodiment in FIG. 2, and details are not described herein again.

Step 1001: Display a process of performing actions in a virtual environment by a virtual character.

Step 1002: Update an existing virtual resource of the virtual character after the virtual character completes the actions.

Step 1003: Display, in response to a difference between a redemption resource and the existing virtual resource being less than a threshold, all or part of pre-ordered props on the virtual environment picture with an entry control as a reference position.

In response to differences between redemption resources respectively corresponding to n pre-ordered props in a pre-ordered prop list of the virtual character and the existing virtual resource are all less than the threshold, the n pre-ordered props are displayed on the virtual environment picture with the entry control as the reference position, n being a positive integer. n may be customized by the user, or n is a default value of the application.

For example, there are a total of four pre-ordered props in the pre-ordered prop list; it is assumed that redemption resources corresponding to a pre-ordered prop 1, a pre-ordered prop 2, a pre-ordered prop 3, and a pre-ordered prop 4 are 1000 gold coins, 1050 gold coins, 1080 gold coins, and 1200 gold coins, respectively, a threshold is 200 gold coins, and the existing virtual resource of the virtual character is 950 gold coins. In this case, differences between the redemption resources corresponding to the pre-ordered prop 1, the pre-ordered prop 2, and the pre-ordered prop 3 and the existing virtual resource are all less than the threshold, and the pre-ordered prop 1, the pre-ordered prop 2, and the pre-ordered prop 3 are displayed on the virtual environment picture with the entry control as the reference position.

In some embodiments, in response to a selection operation on a target pre-ordered prop of the n pre-ordered props, the target pre-ordered prop is automatically purchased for the virtual character when a difference between a redemption resource corresponding to the target pre-ordered prop and the existing virtual resource is greater than or less than the threshold.

For example, the threshold may be a fixed value, or may be a value related to the redemption resource corresponding to the pre-ordered prop. A formula for calculating the threshold is given below:

Threshold=Redemption resource×10%

In some embodiments, the four pre-ordered props are displayed on the virtual environment picture with the entry control as the reference position when the differences between the redemption resources corresponding to the four pre-ordered props in the pre-ordered prop list of the virtual character and the existing virtual resource are all less than the threshold.

In other embodiments of the present disclosure, a pre-ordered prop is displayed on the virtual environment picture with the entry control as the reference position when a property of the virtual character satisfies a default condition. For example, a health recovery prop is displayed when a health point value of the virtual character is lower than 20%; or a physical shield prop is displayed when physical shield points of the virtual character are higher than 400.

In other embodiments of the present disclosure, a pre-ordered prop is displayed on the virtual environment picture with the entry control as the reference position when the virtual character performs a specified action. For example, a transfer prop is displayed when the virtual character moves to a specified position in the virtual environment; or a gain prop corresponding to a recovery skill is displayed when the virtual character casts a recovery skill.

Based on the above, in this embodiment, a pre-ordered prop is directly displayed on a terminal when a difference is less than a threshold. In this way, it is unnecessary to repeatedly open a virtual prop purchase interface on the terminal, to effectively reduce operation steps, thereby improving the viewing efficiency. In addition, the amount of information transmitted by the terminal to a server can be reduced, thereby relieving running load of the server.

Figure 11:
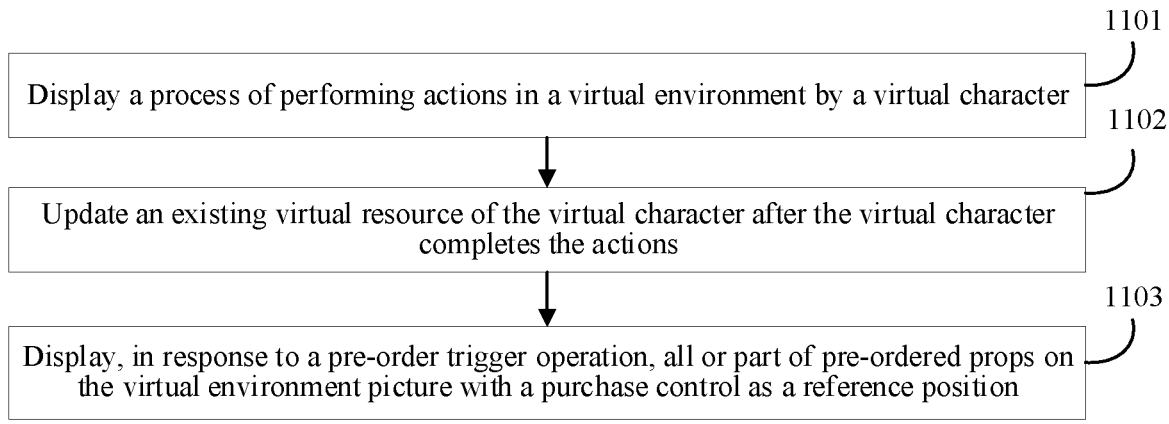
FIG. 11 is a flowchart of a method for displaying a pre-ordered prop according to an exemplary embodiment of the present disclosure.

FIG. 11 is a flowchart of a method for displaying a pre-ordered prop according to an exemplary embodiment of the present disclosure. The method may be performed by the first terminal 120 or the terminal 160 shown in FIG. 1. The method includes the following steps:

In an optional embodiment based on the embodiment in FIG. 2, steps 201 and 202 are alternatively implemented as steps 1101 and 1102 below. For specific embodiments, reference may be made to the embodiment in FIG. 2, and details are not described herein again.

Step 1101: Display a process of performing actions in a virtual environment by a virtual character.

Step 1102: Update an existing virtual resource of the virtual character after the virtual character completes the actions.

Step 1103: Display, in response to a pre-order trigger operation, all or part of pre-ordered props on the virtual environment picture with an entry control as a reference position.

The pre-order trigger operation is used for displaying the pre-ordered props. The pre-order trigger operation may be implemented by pressing one or more preset physical buttons to control the virtual character, or implemented by using signals generated by touching and holding, tapping, double-tapping, and/or sliding in a specified region on a touch-screen.

In some embodiments, in this step, when at least two pre-ordered props are displayed on the virtual environment picture with the entry control as the reference position, the displayed pre-ordered props are classified into unredeemable pre-ordered props.

Further, to facilitate the user to directly view the pre-ordered props, in response to a first trigger operation on the entry control, m unpurchased pre-ordered props in a pre-ordered prop list are displayed on the virtual environment picture with the entry control as the reference position, m being a positive integer. The first trigger operation is different from a second trigger operation, and the second trigger operation is an operation performed on the entry control to trigger the display of a prop mall interface. There is at least one virtual prop on the prop mall interface. For example, the second trigger operation is usually an operation of tapping the entry control, and the display of a prop mall list is triggered. To be distinguished from the second trigger operation, the first trigger operation may be set as an operation of touching and holding the entry control. In some embodiments, in response to the first trigger operation on the entry control, some of the m unpurchased pre-ordered props in the pre-ordered prop list are displayed on the virtual environment picture with the entry control as the reference position, m being a positive integer.

For example, there are a total of four pre-ordered props in the pre-ordered prop list, which are specifically a pre-ordered prop 1, a pre-ordered prop 2, a pre-ordered prop 3, and a pre-ordered prop 4. If the pre-ordered prop 3 has been purchased by the virtual character, in response to the first trigger operation on the entry control, the pre-ordered prop 1, the pre-ordered prop 2, and the pre-ordered prop 4 in the pre-ordered prop list are displayed on the virtual environment picture with the entry control as the reference position.

Figure 12:
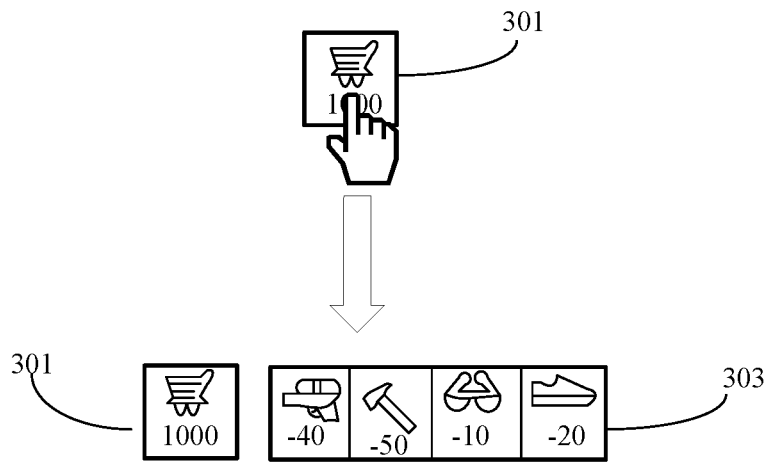
FIG. 12 is a schematic diagram of an interface of a method for displaying a pre-ordered prop according to an exemplary embodiment of the present disclosure.

As shown in FIG. 12, a plurality of pre-ordered props 303 are displayed on a right side of the entry control 301 after the entry control 301 is touched and held.

Based on the above, in this embodiment, a pre-ordered prop may be directly displayed on a terminal rather than on a mall interface. In this way, operation steps can be effectively reduced, thereby improving the viewing efficiency. In addition, the pre-ordered prop can be viewed in many ways. Furthermore, the amount of information transmitted by the terminal to a server can be reduced, thereby relieving running load of the server.

Figure 13:
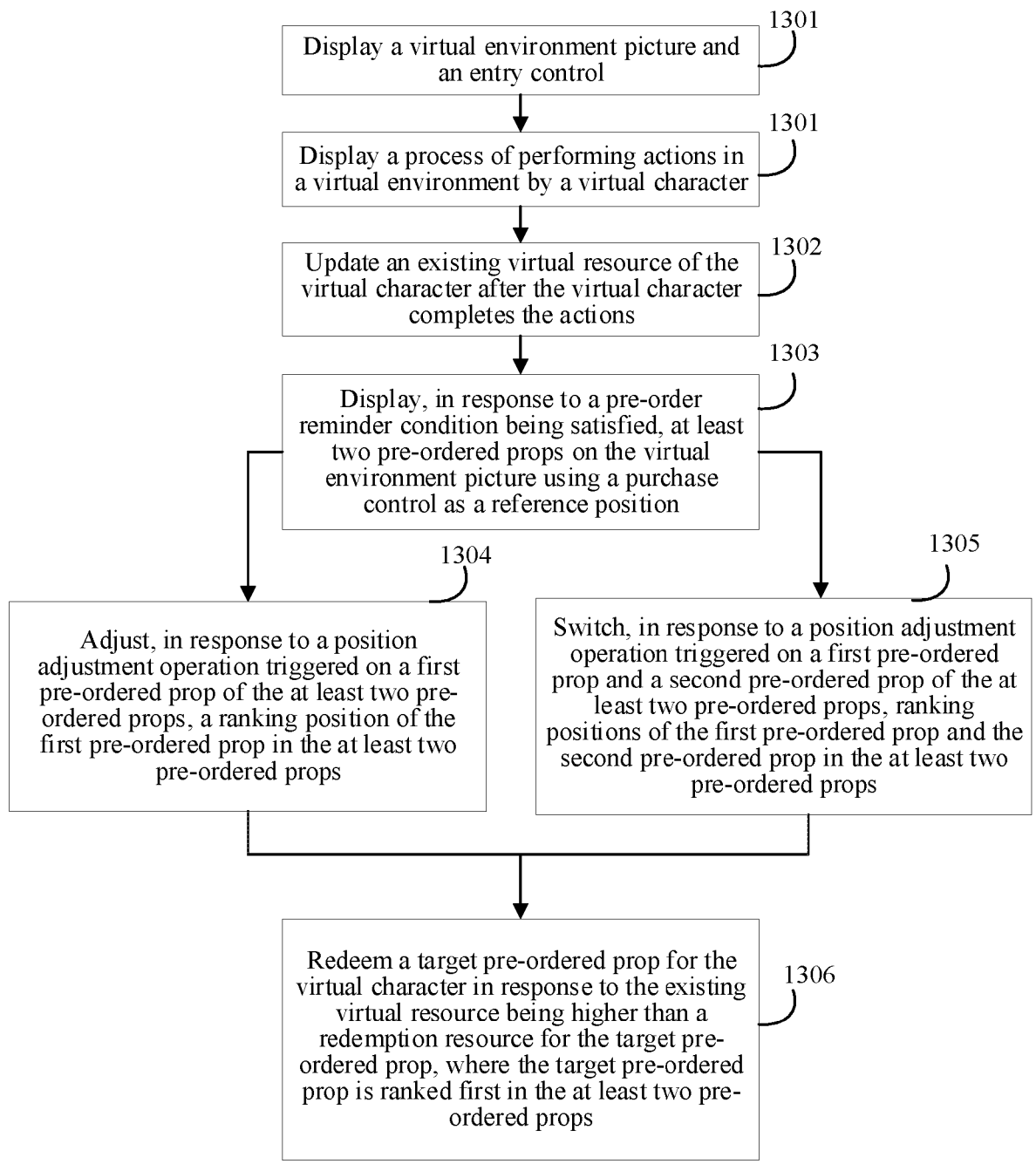
FIG. 13 is a flowchart of a method for adjusting a position of a pre-ordered prop according to an exemplary embodiment of the present disclosure.

When at least two pre-ordered props are displayed, the user may adjust a position of any one of the two pre-ordered props. FIG. 13 is a flowchart of a method for adjusting a position of a pre-ordered prop according to an exemplary embodiment of the present disclosure. The method may be performed by the first terminal 120 or the second terminal 160 shown in FIG. 1, and the method includes the following steps:

In an optional embodiment based on the embodiment in FIG. 2, steps 201 and 203 are alternatively implemented as steps 1301 and 1302 below. For specific embodiments, reference may be made to the embodiment in FIG. 2, and details are not described herein again.

Step 1301: Display a process of performing actions in a virtual environment by a virtual character.

Step 1302: Update an existing virtual resource of the virtual character after the virtual character completes the actions.

Step 1303: Display, in response to a pre-order reminder condition being satisfied, at least two pre-ordered props on a virtual environment picture with an entry control as a reference position.

Figure 14:
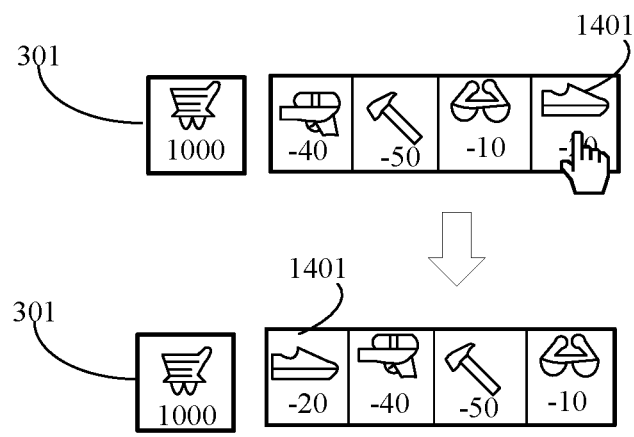
FIG. 14 is a schematic diagram of an interface of a method for adjusting a position of a pre-ordered prop according to an exemplary embodiment of the present disclosure.

As shown in FIG. 14, four pre-ordered props are displayed with the entry control 301 as a head of a row.

Step 1304: Adjust, in response to a position adjustment operation triggered on a first pre-ordered prop of the at least two pre-ordered props, a ranking position of the first pre-ordered prop in the at least two pre-ordered props.

The first pre-ordered prop is any one of the at least two pre-ordered props displayed.

The position adjustment operation is used for adjusting any one or more props of the at least two pre-ordered props. For example, the position adjustment operation is implemented by pressing one or more preset physical buttons, or implemented by using signals generated by touching and holding, tapping, double-tapping, and/or sliding on a touchscreen by the user.

In some embodiments, an adjusted ranking position is determined by the system default configuration, or customized by the user. For example, in response to the position adjustment operation triggered on the first pre-ordered prop of the at least two pre-ordered props, the first pre-ordered prop is adjusted to the first place in the at least two pre-ordered props. For example, in response to the position adjustment operation triggered on the first pre-ordered prop of the at least two pre-ordered props, the first pre-ordered prop is adjusted to any ranking position in the at least two pre-ordered props.

For example, as shown in FIG. 14, after the four pre-ordered props are displayed, a pre-ordered prop 1401 of the four pre-ordered props is tapped, to adjust the pre-ordered prop 1401 to the first place.

Step 1305: Switch, in response to a position adjustment operation triggered on a first pre-ordered prop and a second pre-ordered prop of the at least two pre-ordered props, ranking positions of the first pre-ordered prop and the second pre-ordered prop in the at least two pre-ordered props.

The first pre-ordered prop and the second pre-ordered prop are each any one of the at least two pre-ordered props displayed, and the first pre-ordered prop is different from the second pre-ordered prop.

Figure 15:
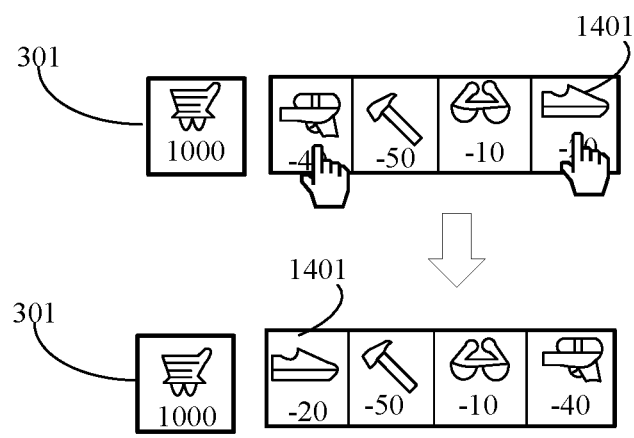
FIG. 15 is a schematic diagram of an interface of a method for adjusting a position of a pre-ordered prop according to an exemplary embodiment of the present disclosure.

For example, as shown in FIG. 15, after the four pre-ordered props are displayed, a pre-ordered prop 1501 and a pre-ordered prop 1502 are tapped, to switch ranking positions of the pre-ordered prop 1501 and the pre-ordered prop 1502.

Step 1306: Redeem a target pre-ordered prop for the virtual character in response to the existing virtual resource being higher than a redemption resource required by the target pre-ordered prop. The target pre-ordered prop is a pre-ordered prop ranked first in the at least two pre-ordered props.

When the user adjusts a pre-ordered prop to the first place, it predictable that the user is very likely to redeem the pre-ordered prop. To facilitate operations of the user and reduce operation steps, the target pre-ordered prop is redeemed for the virtual character when the existing virtual resource is higher than the redemption resource for the target pre-ordered prop.

In some embodiments, the user needs to confirm the redemption of the target pre-ordered prop. For example, the target pre-ordered prop is redeemed for the virtual character in response to a confirmation operation for the target pre-ordered prop.

Based on the above, in this embodiment, after at least two pre-ordered props are displayed, a terminal may switch arrangement positions of the pre-ordered props to adjust the display order of the pre-ordered props, thereby completing the operation of adjusting the arrangement order, and helping the user select a required pre-ordered prop in advance. In addition, the user may determine, according to an actual condition, whether to redeem the pre-ordered prop, thereby increasing options for the user.

Figure 16:
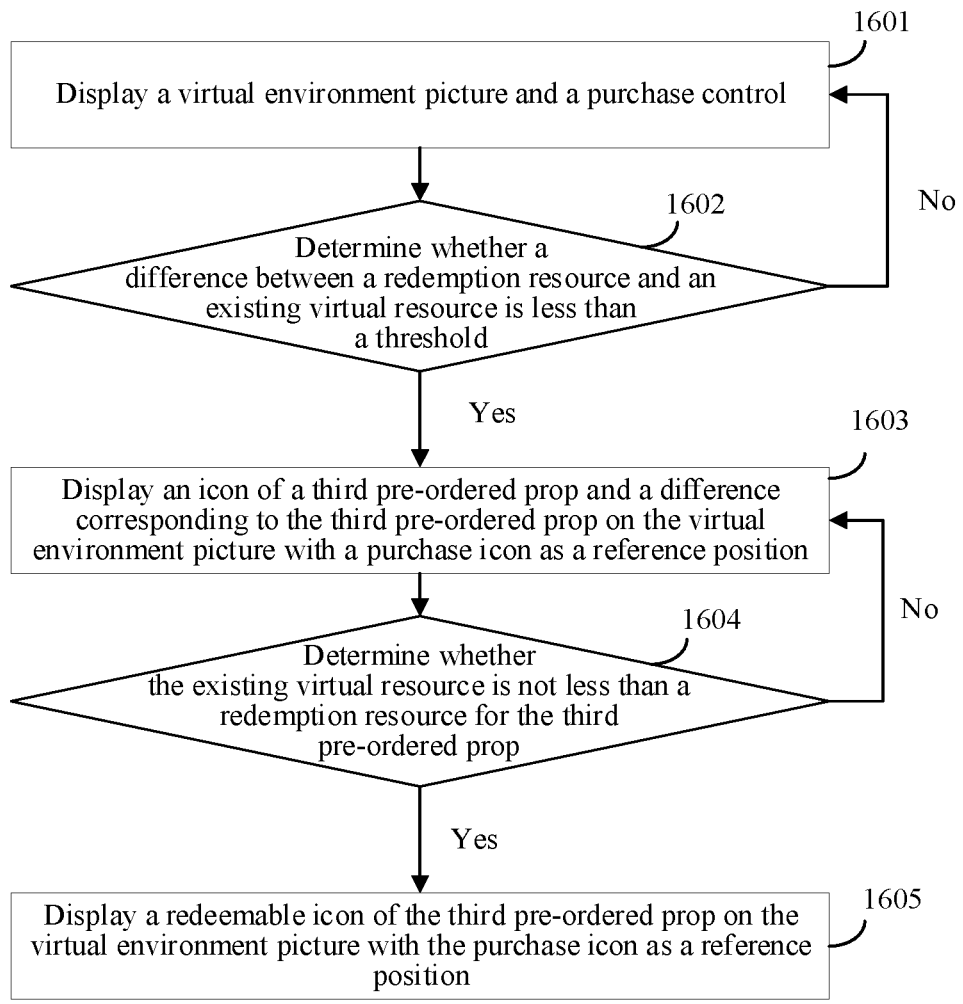
FIG. 16 is a flowchart of a method for displaying a pre-ordered prop according to an exemplary embodiment of the present disclosure.

FIG. 16 is a flowchart of a method for displaying a pre-ordered prop according to an exemplary embodiment of the present disclosure. The method may be performed by the first terminal 120 or the terminal 160 shown in FIG. 1. The method includes the following steps:

Step 1601: Display a virtual environment picture and an entry control.

The virtual environment picture is a display picture of a virtual environment that provides a virtual activity place for the virtual character.

The entry control is related to purchase of a virtual prop for the virtual character.

Step 1602: Determine whether a difference between a redemption resource and an existing virtual resource is less than a threshold.

Step 1602 is performed when the difference between the redemption resource and the existing virtual resource is less than the threshold; and step 1601 is performed when the difference between the redemption resource and the existing virtual resource is not less than the threshold.

The redemption resource refers to a virtual resource required for redeeming a third pre-ordered prop. For example, it takes 200 gold coins to redeem a pre-ordered prop A. The existing virtual resource refers to a virtual resource held by the virtual character. For example, the virtual character has 100 gold coins during a battle.

In some embodiments, the threshold is customized by the user. For example, the threshold is 10% of the redemption resource.

Step 1603: Display an icon of a third pre-ordered prop and a difference corresponding to the third pre-ordered prop at a reference position on the virtual environment picture.

The third pre-ordered prop is any pre-ordered prop in a pre-ordered prop list. In some embodiments, the third pre-ordered prop cannot be tapped.

In some embodiments, the display of the icon of the third pre-ordered prop and the difference corresponding to the third pre-ordered prop is canceled in response to a display cancellation operation.

In some embodiments, the display of the icon of the third pre-ordered prop and the difference corresponding to the third pre-ordered prop is canceled when a display duration of the third pre-ordered prop reaches a preset duration.

In some embodiments, the icon of the third pre-ordered prop and the difference corresponding to the third pre-ordered prop are continuously displayed. In this embodiment, the description is made by using an example in which the icon of the third pre-ordered prop and the difference corresponding to the third pre-ordered prop are continuously displayed.

Figure 17:
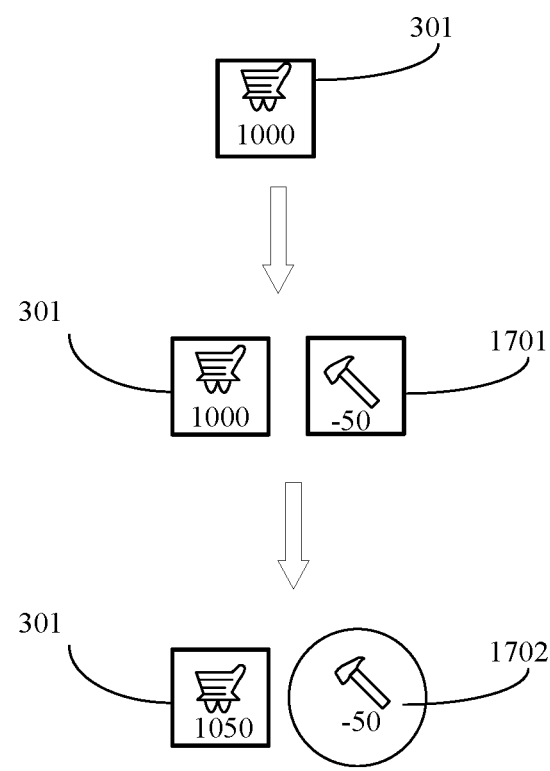
FIG. 17 is a schematic diagram of an interface of a method for displaying a pre-ordered prop according to an exemplary embodiment of the present disclosure.

As shown in FIG. 17, when an existing virtual resource is 1000 gold coins, and a difference between a redemption resource corresponding to the third pre-ordered prop and the existing virtual resource is 50 gold coins, an icon 1701 of the third pre-ordered prop is displayed.

Step 1604: Determine whether the existing virtual resource is not less than a redemption resource for the third pre-ordered prop.

Step 1605 is performed when the existing virtual resource is not less than the redemption resource for the third pre-ordered prop; and step 1603 is performed when the existing virtual resource is less than the redemption resource for the third pre-ordered prop.

For example, the redemption resource is 1000 gold coins, and step 1605 is performed when the existing virtual resource is 1050 gold coins; and step 1603 is performed when the existing virtual resource is 950 gold coins.

Step 1605: Display a redeemable icon of the third pre-ordered prop at the reference position on the virtual environment picture.

In some embodiments, the third pre-ordered prop is redeemed in response to a redemption operation performed on the redeemable icon.

As shown in FIG. 17, when the existing virtual resource is increased to 1050 gold coins, a redeemable icon 1702 of the third pre-ordered prop is displayed. The redeemable icon 1702 of the third pre-ordered prop is different from the icon 1701 of the third pre-ordered prop.

Based on the above, in this embodiment, a difference between a redemption resource and an existing virtual resource is detected to determine whether a pre-ordered prop needs to be displayed, thereby facilitating the operation in a next step. A purchasable prop and a non-purchasable prop are distinguished by displaying an icon of a purchasable pre-ordered prop and an icon of a non-purchasable pre-ordered prop. In this way, there is no need to repeatedly open a virtual prop purchase interface on a terminal, thereby reducing operation steps. In addition, the amount of information transmitted by the terminal to a server can be reduced, thereby relieving running load of the server.

Figure 18:
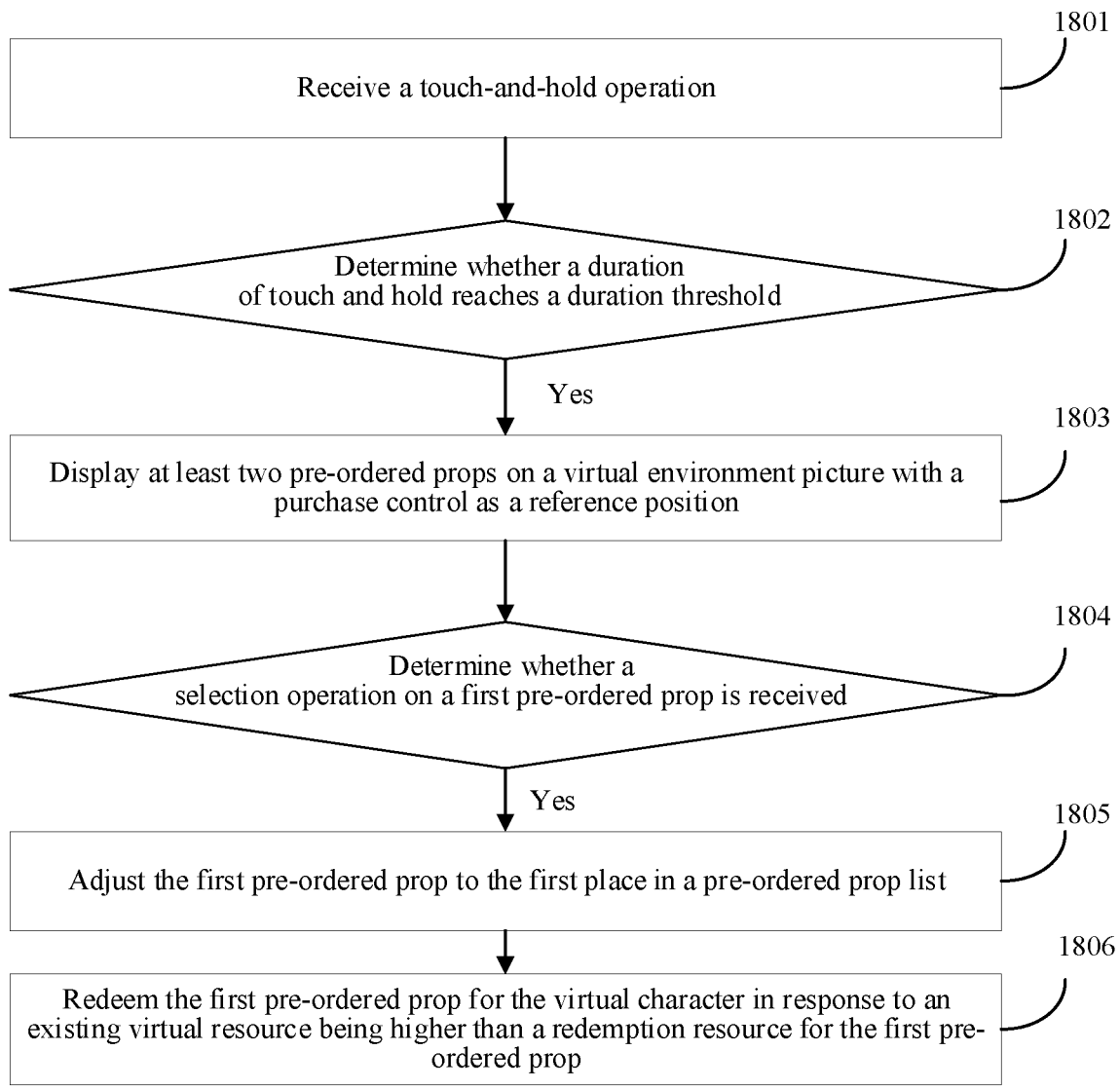
FIG. 18 is a flowchart of a method for adjusting a position of a pre-ordered prop according to an exemplary embodiment of the present disclosure.

FIG. 18 is a flowchart of a method for adjusting a position of a pre-ordered prop according to an exemplary embodiment of the present disclosure. The method may be performed by the first terminal 120 or the second terminal 160 shown in FIG. 1, and the method includes the following steps:

Step 1801: Display, in response to a touch-and-hold operation on an entry control, pre-ordered props on a virtual environment picture with the entry control as a reference position.

The virtual environment picture is a display picture of a virtual environment that provides a virtual activity place for the virtual character.

The entry control is related to purchase of a virtual prop for the virtual character.

Step 1802: Determine whether a duration of touch and hold reaches a duration threshold.

In some embodiments, the duration threshold is customized by the user, or determined according to default configuration of the application. For example, the duration threshold is 0.5 seconds.

Step 1803 is performed when the duration of touch and hold reaches the duration threshold; and A release operation is canceled when the duration of touch and hold does not reach the duration threshold.

Step 1803: Display at least two pre-ordered props on the virtual environment picture with the entry control as a reference position.

Figure 19:
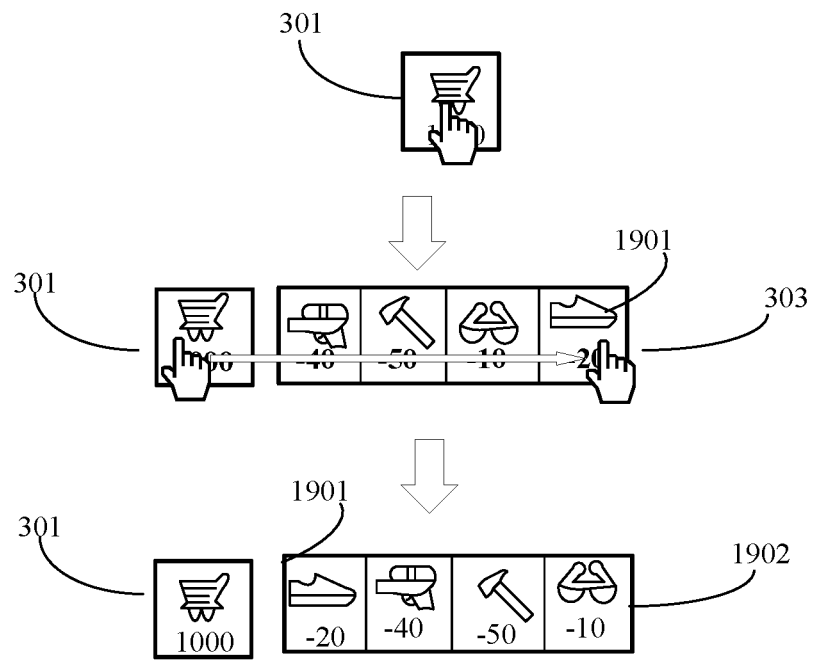
FIG. 19 is a schematic diagram of an interface of a method for adjusting a position of a pre-ordered prop according to an exemplary embodiment of the present disclosure.

As shown in FIG. 19, the pre-ordered props 303 are displayed when the duration of touch and hold by the user reaches the duration threshold.

Step 1804: Determine whether a release operation on a first pre-ordered prop is received.

Step 1805 is performed when the release operation on the first pre-ordered prop is received; and the operation is canceled when no release operation on the first pre-ordered prop is received.

Step 1805: Adjust the first pre-ordered prop to the first place in a pre-ordered prop list.

As shown in FIG. 19, after the user performs the touch-and-hold operation to display the pre-ordered props 303, if the user moves the finger from the entry control 301 to a first pre-ordered prop 1901 without releasing the finger from a touchscreen, and releases the finger from the first pre-ordered prop 1901, the first pre-ordered prop 1901 is adjusted to the first place.

Step 1806: Redeem the first pre-ordered prop for the virtual character in response to an existing virtual resource being higher than a redemption resource for the first pre-ordered prop.

When the first pre-ordered prop is ranked first in the pre-ordered prop list, the user is very likely to redeem the first pre-ordered prop at a further moment, and therefore the first pre-ordered prop is automatically redeemed for the virtual character when the existing virtual resource is higher than the redemption resource for the first pre-ordered prop.

Based on the above, in this embodiment, by detecting a touch-and-hold operation and a release operation performed on a terminal, the terminal can switch an arrangement positions of pre-ordered props, so that an arrangement order of pre-ordered props in a list is adjusted, and the terminal can adjust a pre-ordered prop to be redeemed.

In some embodiments, the present disclosure is applicable to a MOBA game. For example, in a process of playing the MOBA game by the user, pre-ordered props are peripherally displayed around an entry control when a pre-order reminder condition is satisfied.

In some embodiments, the present disclosure is applicable to an FPS game. For example, in a process of playing the FPS game by the user, pre-ordered props are peripherally displayed around an entry control when a pre-order reminder condition is satisfied.

In some embodiments, the present disclosure is applicable to an SLG game. For example, in a process of playing the SLG game by the user, pre-ordered props are peripherally displayed around an entry control when a pre-order reminder condition is satisfied.

Figure 20:
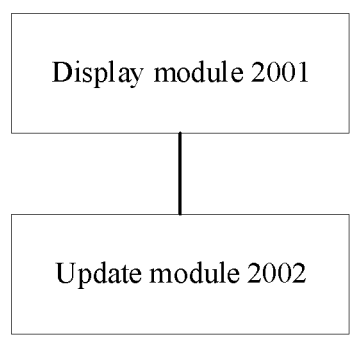
FIG. 20 is a schematic structural diagram of an apparatus for displaying a pre-ordered prop according to an exemplary embodiment of the present disclosure.

FIG. 20 is a schematic structural diagram of an apparatus for displaying a pre-ordered prop according to an exemplary embodiment of the present disclosure. The apparatus may be implemented as an entire computer device or a part of the computer device by using software, hardware, or a combination thereof. An apparatus 2000 includes:

a display module 2001, configured to display a process of performing actions in a virtual environment by a virtual character; and an update module 2002, configured to update an existing virtual resource of the virtual character after the virtual character completes the actions.

The display module 2001 is further configured to display, in response to a pre-order reminder condition being satisfied, all or part of pre-ordered props on a virtual environment picture with an entry control as a reference position, at least one of the pre-ordered props requiring a redemption resource higher than the existing virtual resource of the virtual character, the entry control being a control related to purchase of a virtual prop for the virtual character, and the pre-ordered props being to set before or during a battle.

In an optional design of the present disclosure, the display module 2001 is further configured to display, in response to a difference between the redemption resource and the existing virtual resource being less than a threshold, all or part of the pre-ordered props on the virtual environment picture with the entry control as the reference position.

In an optional design of the present disclosure, the display module 2001 is further configured to display, in response to differences between redemption resources respectively corresponding to n pre-ordered props in a pre-ordered prop list of the virtual character and the existing virtual resource being all less than the threshold, the n pre-ordered props on the virtual environment picture with the entry control as the reference position, n being a positive integer.

In an optional design of the present disclosure, the display module 2001 is further configured to display, in response to a pre-order trigger operation, all or part of the pre-ordered props on the virtual environment picture with the entry control as the reference position.

In an optional design of the present disclosure, the display module 2001 is further configured to display, in response to a first trigger operation performed on the entry control, m unpurchased pre-ordered props in a pre-ordered prop list on the virtual environment picture with the entry control as the reference position, m being a positive integer, where the first trigger operation is different from a second trigger operation, and the second trigger operation is an operation performed on the entry control to trigger the display of a prop mall interface.

In an optional design of the present disclosure, the display module 2001 is further configured to display the pre-ordered props at peripheral positions of the entry control on the virtual environment picture; or sequentially display at least two pre-ordered props on the virtual environment picture with the entry control as a head of a row and according to a ranking order; or sequentially display at least two pre-ordered props on the virtual environment picture with the entry control as a head of a column and according to a ranking order; or circumferentially display at least two pre-ordered props on the virtual environment picture with the entry control as a head of a central position.

In an optional design of the present disclosure, the display module 2001 is further configured to: when there are at least two pre-ordered props, adjust, in response to a position adjustment operation triggered on a first pre-ordered prop of the at least two pre-ordered props, a ranking position of the first pre-ordered prop in the at least two pre-ordered props; or switch, in response to a position adjustment operation triggered on a first pre-ordered prop and a second pre-ordered prop of the at least two pre-ordered props, ranking positions of the first pre-ordered prop and the second pre-ordered prop in the at least two pre-ordered props.

In an optional design of the present disclosure, the update module 2002 is further configured to redeem a target pre-ordered prop for the virtual character in response to the existing virtual resource being higher than a redemption resource for the target pre-ordered prop, where the target pre-ordered prop is a pre-ordered prop ranked first in the at least two pre-ordered props.

In an optional design of the present disclosure, the display module 2001 is further configured to display an icon of the pre-ordered prop and a difference corresponding to the pre-ordered prop on the pre-ordered prop, where the difference is a difference value between the existing virtual resource of the virtual character and a redemption resource required by the pre-ordered prop.

In an optional design of the present disclosure, the display module 2001 is further configured to cancel the display of the pre-ordered prop in response to a display cancellation operation; or cancel the display of the pre-ordered prop when a display duration of the pre-ordered prop reaches a preset duration.

Based on the above, in the technical solutions provided in the embodiments of the present disclosure, when a pre-order reminder condition is satisfied, a terminal directly displays pre-ordered props on a virtual environment picture rather than on a mall interface. In this way, operation steps can be effectively reduced, thereby improving the viewing efficiency. In addition, the amount of information transmitted by the terminal to a server can be reduced, thereby relieving running load of the server.

The present disclosure further provides a terminal, including a processor and a memory, the memory storing at least one instruction, the at least one instruction being loaded and executed by the processor to implement the method for displaying a virtual world picture provided in the foregoing method embodiments. The terminal may be a terminal provided in FIG. 21 below.

Figure 21:
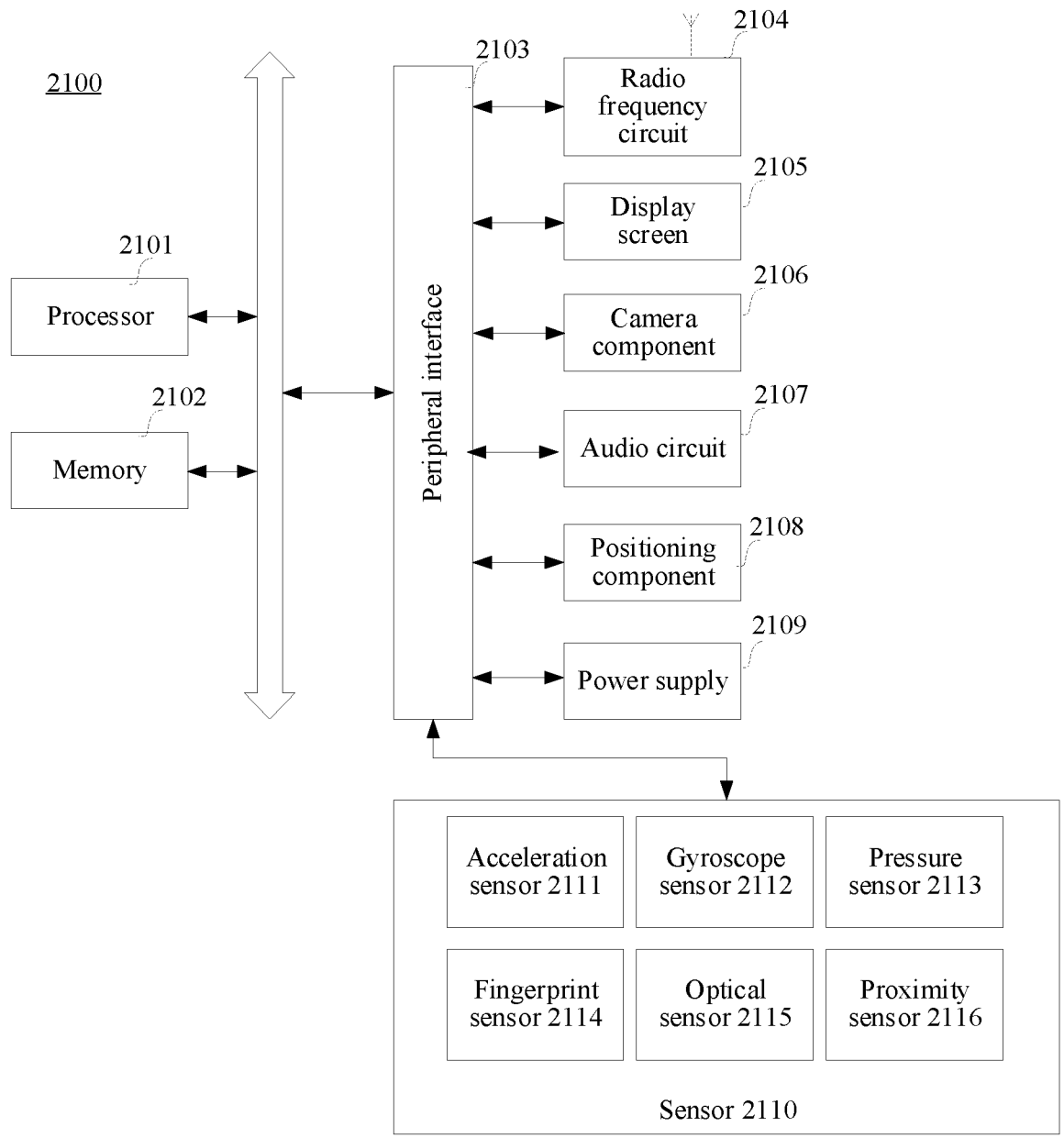
FIG. 21 is a structural block diagram of a terminal according to an exemplary embodiment of the present disclosure.

FIG. 21 shows a structural block diagram of a terminal 2100 according to an exemplary embodiment of the present disclosure. The terminal 2100 may be a smartphone, a tablet computer, a moving picture experts group audio layer III (MP3) player, a moving picture experts group audio layer IV (MP4) player, a notebook computer, or a desktop computer. The terminal 2100 may also be referred to as user equipment, a portable terminal, a laptop terminal, a desktop terminal, or another name.

Generally, the terminal 2100 includes a processor 2101 and a memory 2102.

The processor 2101 may include one or more processing cores, for example, the processor 2101 may be a 4-core processor or an 8-core processor. The processor 2101 may be implemented in at least one hardware form of a digital signal processor (DSP), a field-programmable gate array (FPGA), and a programmable logic array (PLA). The processor 2101 may alternatively include a main processor and a coprocessor. The main processor is configured to process data in an awake state, also referred to as a central processing unit (CPU). The coprocessor is a low-power processor configured to process data in a standby state. In some embodiments, the processor 2101 may be integrated with a graphics processing unit (GPU). The GPU is configured to render and draw content that needs to be displayed on a display. In some embodiments, the processor 2101 may further include an artificial intelligence (AI) processor. The AI processor is configured to process a calculation operation related to machine learning.

The memory 2102 may include one or more computer-readable storage media that may be non-transitory. The memory 2102 may further include a high-speed random access memory and a nonvolatile memory, for example, one or more disk storage devices or flash storage devices. In some embodiments, a non-transitory computer-readable storage medium in the memory 2102 is configured to store at least one instruction, the at least one instruction being configured to be executed by the processor 2101 to implement the method for displaying a pre-ordered prop provided in the method embodiments of the present disclosure.

The display screen 2105 is configured to display a user interface (UI). The UI may include a graph, a text, an icon, a video, and any combination thereof. When the display screen 2105 is a touch display screen, the display screen 2105 is further capable of collecting touch signals on or above a surface of the display screen 2105. The touch signal may be inputted, as a control signal, to the processor 2101 for processing. In this case, the display screen 2105 may be further configured to provide a virtual button and/or a virtual keyboard, which is also referred to as a soft button and/or a soft keyboard. In some embodiments, there may be one display screen 2105, disposed on a front panel of the terminal 2100. In other embodiments, there may be at least two display screens 2105 that are respectively disposed on different surfaces of the terminal 2100 or folded. In still other embodiments, the display screen 2105 may be a flexible display screen disposed on a curved surface or a folded surface of the terminal 2100. Even, the touch display screen 2105 may be further set in a non-rectangular irregular pattern, namely, a special-shaped screen. The display screen 2105 may be prepared by using materials such as a liquid crystal display (LCD), an organic light-emitting diode (OLED), or the like.

The power supply 2109 is configured to supply power for various components in the terminal 2100. The power supply 2109 may be an alternating current, a direct current, a disposable battery, or a rechargeable battery. When the power supply 2109 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charge technology.

A person skilled in the art may understand that the structure shown in FIG. 21 does not constitute a limitation on the terminal 2100, and the terminal may include more or fewer components than those shown in the figure, or some components may be combined, or a different component deployment may be used.

Figure 22:
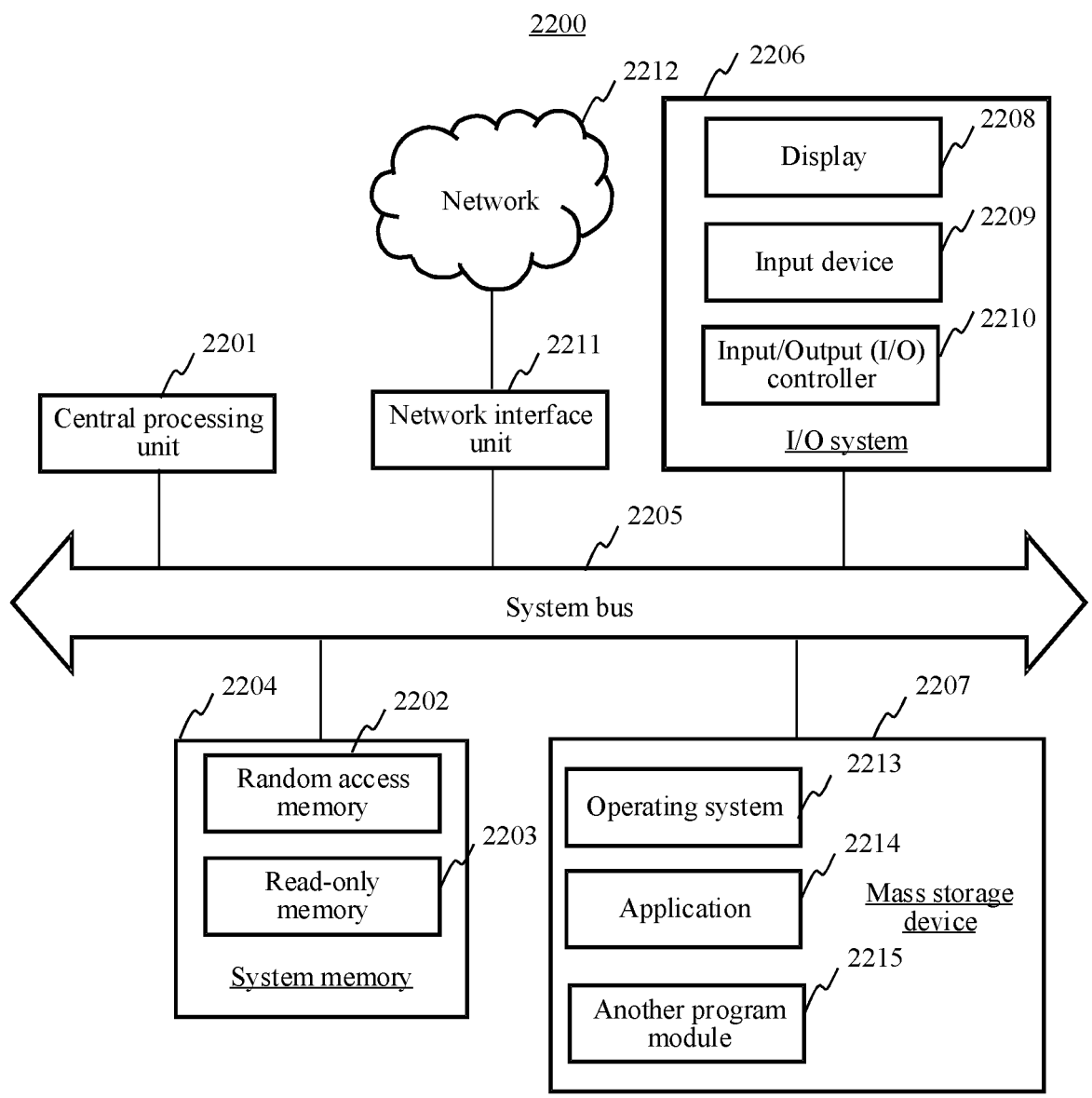
FIG. 22 is a schematic structural diagram of a server according to an exemplary embodiment of the present disclosure.

FIG. 22 is a schematic structural diagram of a server according to an embodiment of the present disclosure. Specifically, a server 2200 includes a CPU 2201, a system memory 2204 including a RAM 2202 and a read-only memory (ROM) 2203, and a system bus 2205 connecting the system memory 2204 and the CPU 2201. The computer device 2200 further includes a basic input/output (I/O) system 2206 configured to transmit information between components in a computer, and a mass storage device 2207 configured to store an operating system 2213, an application program 2214, and another program module 2215.

The basic I/O system 2206 includes a display 2208 configured to display information, and an input device 2209 configured to allow a user to enter information, for example, a mouse, or a keyboard. The display 2208 and the input device 2209 are both connected to the CPU 2201 by using an input/output controller 2210 connected to the system bus 2205. The basic input/output system 2206 may further include the input/output controller 2210 configured to receive and process input from multiple other devices such as the keyboard, the mouse, or an electronic stylus. Similarly, the input/output controller 2210 further provides an output to a display screen, a printer, or another type of output device.

The mass storage device 2207 is connected to the CPU 2201 by using a mass storage controller (not shown) connected to the system bus 2205. The mass storage device 2207 and a computer-readable medium associated with the mass storage device provide non-volatile storage for the server 2200. That is, the mass storage device 2207 may include a computer-readable medium (not shown) such as a hard disk or a compact disc ROM (CD-ROM) drive.

Generally, the computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art may know that the computer storage medium is not limited to the foregoing types. The system memory 2204 and the mass storage device 2207 may be collectively referred to as a memory.

According to various embodiments of the present disclosure, the server 2200 may further be connected, by using a network such as the Internet, to a remote computer on the network and run. That is, the server 2200 may be connected to a network 2212 by using a network interface unit 2211 that is connected to the system bus 2205, or may be connected to a network of another type or a remote computer system (not shown) by using the network interface unit 2211.

According to another aspect of the present disclosure, a computer storage medium is provided, storing at least one instruction code, the at least one instruction code being loaded and executed by a processor to perform the method for displaying a pre-ordered prop as described above.

According to another aspect of the present disclosure, a computer program product or a computer program is further provided, the computer program product or the computer program including computer instructions, the computer instructions being stored in a computer-readable storage medium. A processor of the computer device reads the computer instructions from the computer-readable storage medium and executes the computer instructions, to cause the computer device to perform the method for displaying a pre-ordered prop as described above.

It is to be understood that "plurality of" mentioned in the specification means two or more. And/or describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a ROM, a magnetic disk, an optical disc, or the like.

The foregoing descriptions are merely exemplary embodiments of the present disclosure, and are not intended to limit the present disclosure. Any modification, equivalent replacement, improvement and the like made within the spirit and principle of the present disclosure shall fall within the protection scope of the present disclosure.

What is claimed is:

1. A method for displaying a pre-ordered prop, performed by a terminal, the method comprising:
   displaying a process of performing actions by a virtual character in a virtual environment;
   updating an existing virtual resource of the virtual character after the virtual character completes the actions; and
   displaying, in the virtual environment where the virtual character completes the actions and in response to a satisfaction of a pre-order reminder condition, all or part of pre-ordered props using an entry control as a reference position, at least one of the pre-ordered props requiring a redemption resource higher than the existing virtual resource of the virtual character, the entry control being a control related to purchase of a virtual prop for the virtual character, and the pre-ordered props being set before or during a battle, wherein
   the pre-order reminder condition includes a difference between the existing virtual resource and the redemption resource for one of the at least one pre-ordered props being less than a threshold.

2. The method according to claim 1, wherein the displaying, in the virtual environment where the virtual character completes the actions and in response to the satisfaction of the pre-order reminder condition, all or part of the pre-ordered props using an entry control as the reference position comprises:
   displaying, in response to differences between redemption resources, that respectively correspond to n pre-ordered props in a pre-ordered prop list of the virtual character, and the existing virtual resource being all less than the threshold, the n pre-ordered props on the virtual environment picture using the entry control as the reference position, n being a positive integer.

3. The method according to claim 1, wherein the pre-order reminder condition further includes a pre-order trigger operation being detected.

4. The method according to claim 3, wherein the displaying, in the virtual environment where the virtual character completes the actions and in response to the pre-order trigger operation, all or part of the pre-ordered props using the entry control as the reference position comprises:
   displaying, in response to a first trigger operation performed on the entry control, m unpurchased pre-ordered props in a pre-ordered prop list on the virtual environment picture using the entry control as the reference position, m being a positive integer, wherein
   the first trigger operation is different from a second trigger operation, and the second trigger operation is an operation performed on the entry control to trigger a display of a prop mall interface.

5. The method according to claim 1, wherein displaying, in the virtual environment where the virtual character completes the actions and in response to a satisfaction of a pre-order reminder condition, all or part of the pre-ordered props using the entry control as the reference position comprises:
   displaying the pre-ordered props at peripheral positions of the entry control on the virtual environment picture; or
   displaying at least two pre-ordered props on the virtual environment picture according to a ranking order with the entry control as a head of a row; or
   displaying at least two pre-ordered props on the virtual environment picture according to a ranking order with the entry control as a head of a column; or
   circumferentially displaying at least two pre-ordered props on the virtual environment picture with the entry control as a central position.

6. The method according to claim 1, wherein there are at least two pre-ordered props,
   and the method further comprises:
   adjusting, in response to a position adjustment operation triggered on a first pre-ordered prop of the at least two pre-ordered props, a ranking position of the first pre-ordered prop in the at least two pre-ordered props; or
   switching, in response to a position adjustment operation triggered on a first pre-ordered prop and a second pre-ordered prop of the at least two pre-ordered props, ranking positions of the first pre-ordered prop and the second pre-ordered prop in the at least two pre-ordered props.

7. The method according to claim 6, further comprising:
   redeeming a target pre-ordered prop for the virtual character in response to the existing virtual resource being higher than a redemption resource for the target pre-ordered prop, wherein
   the target pre-ordered prop is ranked first in the at least two pre-ordered props.

8. The method according to claim 1, wherein
   an icon of the pre-ordered prop and a difference corresponding to the pre-ordered prop are displayed on the pre-ordered prop, and the difference is a difference value between the existing virtual resource of the virtual character and a redemption resource required by the pre-ordered prop.

9. The method according to claim 1, further comprising:
canceling display of the pre-ordered prop in response to a display cancellation operation; or
canceling display of the pre-ordered prop when a display duration of the pre-ordered prop reaches a preset duration.

10. A computer device, comprising a processor and a memory, the memory storing at least one instruction, at least one program, a code set, or an instruction set, the at least one instruction, the at least one program, the code set, or the instruction set being loaded and executed by the processor to perform:
displaying a process of performing actions by a virtual character in a virtual environment;
updating an existing virtual resource of the virtual character after the virtual character completes the actions; and
displaying, in the virtual environment where the virtual character completes the actions and in response to a satisfaction of a pre-order reminder condition, all or part of pre-ordered props using an entry control as a reference position, at least one of the pre-ordered props requiring a redemption resource higher than the existing virtual resource of the virtual character, the entry control being a control related to purchase of a virtual prop for the virtual character, and the pre-ordered props being set before or during a battle, wherein
the pre-order reminder condition includes a difference between the existing virtual resource and the redemption resource for one of the at least one pre-ordered props being less than a threshold.

11. The computer device according to claim 10, wherein the displaying, in the virtual environment where the virtual character completes the actions and in response to the satisfaction of the pre-order reminder condition, all or part of the pre-ordered props using an entry control as the reference position comprises:
displaying, in response to differences between redemption resources, that respectively correspond to n pre-ordered props in a pre-ordered prop list of the virtual character, and the existing virtual resource being all less than the threshold, the n pre-ordered props on the virtual environment picture using the entry control as the reference position, n being a positive integer.

12. The computer device according to claim 10, wherein the pre-order reminder condition further includes a pre-order trigger operation being detected.

13. The computer device according to claim 12, wherein the displaying, in the virtual environment where the virtual character completes the actions and in response to the pre-order trigger operation, all or part of the pre-ordered props using the entry control as the reference position comprises:
displaying, in response to a first trigger operation performed on the entry control, m unpurchased pre-ordered props in a pre-ordered prop list on the virtual environment picture using the entry control as the reference position, m being a positive integer, wherein
the first trigger operation is different from a second trigger operation, and the second trigger operation is an operation performed on the entry control to trigger a display of a prop mall interface.

14. The computer device according to claim 10, wherein displaying, in the virtual environment where the virtual character completes the actions and in response to a satisfaction of a pre-order reminder condition, all or part of the pre-ordered props using the entry control as the reference position comprises:
displaying the pre-ordered props at peripheral positions of the entry control on the virtual environment picture; or
displaying at least two pre-ordered props on the virtual environment picture according to a ranking order with the entry control as a head of a row; or
displaying at least two pre-ordered props on the virtual environment picture according to a ranking order with the entry control as a head of a column; or
circumferentially displaying at least two pre-ordered props on the virtual environment picture with the entry control as a central position.

15. The computer device according to claim 10, wherein there are at least two pre-ordered props, and the processor is further configured to perform:
adjusting, in response to a position adjustment operation triggered on a first pre-ordered prop of the at least two pre-ordered props, a ranking position of the first pre-ordered prop in the at least two pre-ordered props; or
switching, in response to a position adjustment operation triggered on a first pre-ordered prop and a second pre-ordered prop of the at least two pre-ordered props, ranking positions of the first pre-ordered prop and the second pre-ordered prop in the at least two pre-ordered props.

16. The computer device according to claim 15, wherein the processor is further configured to perform:
redeeming a target pre-ordered prop for the virtual character in response to the existing virtual resource being higher than a redemption resource for the target pre-ordered prop, wherein
the target pre-ordered prop is ranked first in the at least two pre-ordered props.

17. The computer device according to claim 15, wherein the processor is further configured to perform:
canceling display of the pre-ordered prop in response to a display cancellation operation; or
canceling display of the pre-ordered prop when a display duration of the pre-ordered prop reaches a preset duration.

18. A non-transitory computer-readable storage medium, storing at least one program code, the at least one program code being loaded and executed by a processor to perform:
displaying a process of performing actions by a virtual character in a virtual environment;
updating an existing virtual resource of the virtual character after the virtual character completes the actions; and
displaying, in the virtual environment where the virtual character completes the actions and in response to a satisfaction of a pre-order reminder condition, all or part of pre-ordered props using an entry control as a reference position, at least one of the pre-ordered props requiring a redemption resource higher than the existing virtual resource of the virtual character, the entry control being a control related to purchase of a virtual prop for the virtual character, and the pre-ordered props being set before or during a battle, wherein
the pre-order reminder condition includes a difference between the existing virtual resource and the redemption resource for one of the at least one pre-ordered props being less than a threshold.

* * * * *